United States Patent
Terada

(10) Patent No.: US 8,765,861 B2
(45) Date of Patent: Jul. 1, 2014

(54) MASTERBATCH PELLET, PRODUCTION METHOD THEREFOR AND POLYAMIDE RESIN COMPOSITION CONTAINING MASTERBATCH PELLET

(75) Inventor: Kazunori Terada, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/697,194

(22) PCT Filed: May 20, 2011

(86) PCT No.: PCT/JP2011/061672
§ 371 (c)(1),
(2), (4) Date: Nov. 9, 2012

(87) PCT Pub. No.: WO2011/145730
PCT Pub. Date: Nov. 24, 2011

(65) Prior Publication Data
US 2013/0059962 A1 Mar. 7, 2013

(30) Foreign Application Priority Data
May 21, 2010 (JP) .................................. 2010-117506

(51) Int. Cl.
*C08J 3/22* (2006.01)
*C08K 3/22* (2006.01)
*B29B 9/00* (2006.01)

(52) U.S. Cl.
CPC .............. *C08J 3/226* (2013.01); *C08J 2377/00* (2013.01); *C08K 3/22* (2013.01); *B29B 9/00* (2013.01)
USPC ............................ 524/431; 106/460; 106/504

(58) Field of Classification Search
CPC .......... C08J 3/22; C08J 3/226; C08J 2377/00; C08K 3/22; B29B 9/00
USPC .................................. 524/431; 106/460, 540
See application file for complete search history.

(56) References Cited

U.S. PATENT DOCUMENTS

| | | | | |
|---|---|---|---|---|
| 3,844,810 A | * | 10/1974 | Pollard | 106/452 |
| 4,002,593 A | * | 1/1977 | Jones | 523/318 |
| 4,116,924 A | * | 9/1978 | Peabody | 524/270 |
| 4,710,535 A | * | 12/1987 | Perrot et al. | 524/413 |
| 7,572,195 B2 | * | 8/2009 | Egashira et al. | 473/351 |
| 7,767,749 B2 | * | 8/2010 | Wilson, III | 524/525 |
| 2006/0155034 A1 | | 7/2006 | Gijsman et al. | |
| 2008/0146717 A1 | * | 6/2008 | Gijsman et al. | 524/431 |
| 2008/0146718 A1 | | 6/2008 | Gijsman et al. | |
| 2013/0281655 A1 | | 10/2013 | Shikano et al. | |

FOREIGN PATENT DOCUMENTS

| | | |
|---|---|---|
| DE | 19859298 | 6/2000 |
| JP | 2006-528260 | 12/2006 |
| JP | 2008-527127 | 7/2008 |
| JP | 2008-527129 | 7/2008 |
| JP | 2009-120692 | 6/2009 |
| JP | 2010-024329 | 2/2010 |
| WO | 2009/113590 A | 9/2009 |

OTHER PUBLICATIONS

RheinChemie (Rhenogran ZnO-80 Technical Data Sheet. Rhein Chemie. Apr. 2012, 2 pages).*
Vertellus (Paricin 285, Vertellus Specialties, 2006, 1 page).*
International Preliminary Report on Patentability for International Application No. PCT/JP2011/061672, mail date is Dec. 4, 2012.
Japanese Office Action issued with respect to Japanese Patent Application No. 2012-515948, mail date is Jan. 23, 2014.

* cited by examiner

*Primary Examiner* — Brieann R Fink
(74) *Attorney, Agent, or Firm* — Greenblum & Bernstein, P.L.C.

(57) ABSTRACT

A masterbatch pellet is provided for obtaining a polyamide resin composition excellent in mechanical strength and heat aging resistance. The masterbatch pellet is obtained by melt-kneading a raw material component containing a thermoplastic resin (A) and a metal oxide (B), wherein a content of the metal oxide (B) is 0.5% by mass or more and a fraction of the metal oxide (B) after the melt kneading is present as an aggregated particle of 5 μm or more in a major axis length. A proportion of the aggregated particle of 5 μm or more in a major axis length in a whole metal oxide after the melt kneading is preferably 30% by mass or less.

13 Claims, No Drawings

MASTERBATCH PELLET, PRODUCTION METHOD THEREFOR AND POLYAMIDE RESIN COMPOSITION CONTAINING MASTERBATCH PELLET

TECHNICAL FIELD

The present invention relates to a masterbatch pellet, a production method therefor and a polyamide resin composition containing the masterbatch pellet.

BACKGROUND ART

Polyamide resin has excellent mechanical properties (such as mechanical strength, rigidity and impact resistance), toughness, heat resistance and chemical resistance, and hence are used in various industrial fields including clothing material, industrial materials, automobiles, electric and electronic and other industries. In particular, polyamide resin is excellent in heat aging resistance as compared to other resins. Accordingly, polyamide resins are used as materials for components in the places having very large quantity of heat, such as the interior of engine rooms of automobiles.

Recently, in engine rooms of automobiles, the environmental temperature of the engine rooms become higher than ever due to the high densification of the components and the increase of the engine output. Accordingly, polyamide resin used as materials for components of the automobile engine rooms are demanded to have such a high (long term) heat aging resistance as significantly exceeding the hitherto existing level.

As a technique to improve the heat aging resistance of polyamide resin, there has hitherto been known a technique in which a copper compound (an oxide or a salt of copper) is added to polyamide resin.

Similarly, as a technique to improve the heat aging resistance of polyamide resin, there have also been disclosed a technique in which a cooper compound and iron oxide is mixed in tow types of polyamides different in melting point from each other (for example, see Patent Document 1), a technique in which a fine powder elementary iron is mixed in polyamide (for example, see Patent Document 2), and a technique in which a finely dispersed metal powder is mixed in polyamide (for example, see Patent Document 3).

On the other hand, there has been disclosed a technique in which magnetite is finely dispersed in nano scale in a polyamide resin to obtain a composition excellent in surface exterior appearance (for example, see Patent Document 4).

CITATION LIST

Patent Document

Patent Document 1: National Publication of International Patent Application No. 2008-527129
Patent Document 2: National Publication of International Patent Application No. 2006-528260
Patent Document 3: National Publication of International Patent Application No. 2008-527127
Patent Document 4: Germany Patent Application No. DE 19859298 A

SUMMARY OF INVENTION

Problems to be Solved by Invention

However, the polyamide resin compositions obtained by these conventional techniques are not sufficient in (long term) heat aging resistance; for the purpose of using polyamide resin compositions as materials, for example, for components of automobile engine rooms, polyamide resin compositions having more excellent mechanical strength and heat aging resistance than hitherto are demanded.

Accordingly, the technical problem of the present invention is to provide a masterbatch pellet for obtaining a polyamide resin composition excellent in mechanical strength and heat aging resistance, and in particular, small in the variation of the mechanical strength after long period thermal aging and excellent in thermal stability.

Means for Solving Problems

The present inventors performed a diligent investigation for the purpose of solving the aforementioned technical problem. Consequently, the present inventors have perfected the present invention by discovering that the aforementioned technical problem can be solved by using a specific masterbatch pellet which is obtained by melt-kneading a thermoplastic resin and a specific metal oxide and in which a fraction of the metal oxide is present as an aggregated particle of 5 μm or more in a major axis length.

Specifically, the present invention is as follows.

[1]
A masterbatch pellet obtained by melt-kneading a raw material component comprising a thermoplastic resin (A) and a metal oxide (B), wherein a content of the metal oxide (B) is 0.5% by mass or more; and a fraction of the metal oxide (B) after the melt-kneading is present as an aggregated particle of 5 μm or more in a major axis length.

[2]
The masterbatch pellet according to [1], wherein the proportion of the aggregated particle of 5 μm or more in a major axis length in a whole metal oxide (B) after the melt-kneading is 30% by mass or less.

[3]
The masterbatch pellet according to [1] or [2], wherein the number of the aggregated particle of 5 μm or more in the major axis length in the metal oxide (B) after the melt-kneading per 1 mm$^2$ of a cross section of the masterbatch pellet is 1 to 30/mm$^2$.

[4]
The masterbatch pellet according to any one of [1] to [3], wherein the raw material component further comprises a dispersant (C); and the dispersant (C) and the metal oxide (B) are preliminarily mixed before the melt-kneading.

[5]
The masterbatch pellet according to any one of [1] to [4], wherein the thermoplastic resin (A) is polyamide.

[6]
The masterbatch pellet according to any one of [1] to [5], wherein the metal oxide (B) is iron oxide.

[7]
The masterbatch pellet according to [4], wherein the dispersant (C) is a higher fatty acid amide having a melting point of 120° C. or higher.

[8]
A method for producing the masterbatch pellet according to any one of [1] to [7], comprising melt-kneading a raw material component comprising a thermoplastic resin (A) and a metal oxide (B) by using an extruder.

[9]
The method for producing the masterbatch pellet according to [8], wherein the raw material component further comprises a dispersant (C); and the method further comprises, before the melt-kneading, preliminary mixing the dispersant (C) and the metal oxide (B).

[10]

A polyamide resin composition comprising:
the masterbatch pellet according to any one of [1] to [7]; and
a polyamide resin.

[11]

The polyamide resin composition according to [10], wherein a fraction of the metal oxide (B) is present in the polyamide resin composition as an aggregated particle of 5 μm or more in a major axis length.

[12]

A polyamide resin composition obtained by melt-kneading a raw material component comprising a polyamide resin and a metal oxide (B), wherein a fraction of the metal oxide (B) after the melt-kneading is present as an aggregated particle of 5 μm or more in a major axis length.

[13]

The polyamide resin composition according to any one of [10] to [12], further comprising: a copper compound; and an alkali metal halide and/or an alkaline earth metal halide.

Advantageous Effects of Invention

According to the masterbatch pellet of the present invention, it is possible to provide a polyamide resin composition excellent in mechanical strength and heat aging resistance, and in particular, small in the variation of the mechanical strength after a long period of thermal aging and excellent in thermal stability.

Mode for Carrying Out Invention

Hereinafter, the embodiment for carrying out the present invention (hereinafter, referred to as "the present embodiment") is described in detail. The present invention is not limited by the following embodiment and can be carried out in various modifications within the scope of the gist of the present invention.

The present embodiment relates to a masterbatch pellet which is obtained by melt-kneading the raw material component containing a thermoplastic resin (A) and a metal oxide (B) and in which a content of the metal oxide (B) is 0.5% by mass or more and a fraction of the metal oxide (B) after the melt-kneading is present as aggregated particles of 5 μm or more in a major axis length.

Hereinafter, each of the constituent components of the masterbatch pellet is described in detail.

[Thermoplastic Resin (A)]

The thermoplastic resin (A) used in the present embodiment is not particularly limited as long as the thermoplastic resin (A) is adaptable to melt-kneading.

Specific examples of the thermoplastic resin (A) include: polyolefins such as polyethylene and polypropylene; polyesters such as polyethylene terephthalate, polybutylene terephthalate, polytrimethylene terephthalate, polyethylene naphthalate, polybutylene naphthalate and liquid crystal polyester; polyaryl ketones such as polyether ketone, polyether ether ketone and polyether ketone ketone; polystyrene; syndiotactic polystyrene; polyamide; polyphenylene sulfide; polyphenylene ether; polycarbonate; polyarylate; polysulfone; polyethersulfone; and polyetherimide.

From the viewpoint of extrusion workability, preferable among these are polyethylene, polypropylene, polyethylene terephthalate, polybutylene terephthalate, liquid crystal polyester, polyamide and polyphenylene sulfide; polyamide is more preferable.

(Polyamide)

In the present embodiment, polyamide means a polymer compound having in the main chain thereof a —CO—NH—(amide)bond. Examples of the polyamide are not limited to but include: a polyamide obtained by ring-opening polymerization of lactam; a polyamide obtained by self-condensation of ω-aminocarboxylic acid; a polyamide obtained by condensation of diamine and dicarboxylic acid; and copolymers of these. These polyamides may be used each alone or in combinations of two or more thereof. Hereinafter, the raw materials for the polyamide used in the present embodiment are described.

Examples of the lactam as the monomer that is a constitutional component of polyamide are not limited to but include pyrrolidone, caprolactam, undecalactam and docecalactam. On the other hand, examples of ω-aminocarboxylic acid are not limited to but include ω-aminocarboxylic acids derived from ring opening involving water of the aforementioned lactams. The lactams or the ω-aminocarboxylic acids respectively may be used in combinations of two or more to be condensed.

Next, the polyamide obtained by condensation of diamine and dicarboxylic acid is described. Examples of the diamine (monomer) are not limited to but include: linear aliphatic diamines such as hexamethylenediamine and pentamethylenediamine; branched aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine and cyclooctanediamine. On the other hand, examples of the dicarboxylic acid (monomer) are not limited to but include: aliphatic dicarboxylic acids such as adipic acid, pimelic acid and sebacic acid; aromatic dicarboxylic acids such as phthalic acid and isophthalic acid; and alicyclic dicarboxylic acids such as cyclohexanedicarboxylic acid. The diamines as monomers and the dicarboxylic acids as monomers respectively may be used each alone or in combinations of two or more thereof to be condensed.

Examples of the polyamide used in the present embodiment are not limited to but include: polyamide 4 (poly-α-pyrrolidone), polyamide 6 (polycaproamide), polyamide 11 (polyundecaneamide), polyamide 12 (polydodecaneamide), polyamide 46 (polytetramethylene adipamide), polyamide 56 (polypentamethylene adipamide), polyamide 66 (polyhexamethylene adipamide), polyamide 610 (polyhexamethylene sebacamide), polyamide 612 (polyhexamethylene dodecamide), polyamide 6T (polyhexamethylene terephthalamide), polyamide 9T (polynonamethylene terephthalamide) and polyamide 6I (polyhexamethylene isophthalamide); and copolymerized polyamides containing at least one of these as the constitutional component thereof.

More preferable among the above-listed polyamides are the polyamides in which the ratio of the number of carbon atoms/the number of nitrogen atoms (C/N ratio) in the polymer chain exceeds 5, from the viewpoint of the heat aging resistance of the polyamide resin composition. Examples of the preferable polyamide satisfying such a condition include: polyamide 6, polyamide 66, polyamide 610, polyamide 612, polyamide 6T, polyamide 6I and polyamide 9T; and one or more selected from the group consisting of the copolymerized polyamides containing at least one of these as the constitutional component thereof. The C/N ratio is more preferably more than 5 and 15 or less and furthermore preferably more than 5 and 12 or less.

Examples of the copolymerized polyamide are not limited to but include: a copolymer of hexamethylene adipamide and hexamethylene terephthalamide; a copolymer of hexamethylene adipamide and hexamethylene isophthalamide; and a copolymer of hexamethylene terephthalamide and 2-methylpentanediamine terephthalamide.

The melting point of each of these polyamides is preferably 200 to 280° C. The melting point of each of these polyamides is preferably 200° C. or higher from the viewpoint of the heat resistance of the polyamide resin composition, and is preferably 280° C. or lower from the viewpoint of the heat aging resistance of the polyamide resin composition. The melting point of each of these polyamides is more preferably 210 to 270° C. and furthermore preferably 240 to 270° C.

The measurement of the melting points of the polyamides can be performed according to JIS-K7121. Examples of the measurement apparatus include Diamond-DSC manufactured by Perkin-Elmer Corp.

Terminal groups present in the aforementioned polyamides are amino groups and carboxyl groups. The ratio between these terminal groups in the present embodiment, in terms of the ratio of amino group concentration/carboxyl group concentration, is preferably 9/1 to 1/9, more preferably 6/4 to 1/9 and furthermore preferably 5/5 to 1/9. The ratio of amino group concentration/carboxyl group concentration falling within the aforementioned range results in a tendency such that the mechanical strength of the polyamide resin composition can be more improved.

The terminal amino group concentration is preferably 10 to 100 µmol/g, more preferably 15 to 80 µmol/g and furthermore preferably 30 to 80 µmol/g. When the terminal amino group concentration falls within the aforementioned range, there is a tendency such that the mechanical strength of the polyamide resin composition can be significantly improved.

In the present Description, the measurement methods of the terminal amino group concentration and the terminal carboxyl group concentration allow these concentrations to be derived from the integrated values of the characteristic signals of these terminal groups as measured with $^1$H-NMR.

The terminal group of the polyamide may be regulated separately. As such a regulation method, heretofore known methods can be used. Examples of such a method is not limited to but include a method in which a terminal regulating agent is used. Specific examples of such a method include a method in which one or more selected from the group consisting of a monoamine compound, a diamine compound, a monocarboxylic acid compound and a dicarboxylic acid compound is added in such a way that predetermined terminal concentrations are obtained at the time of polymerization of the polyamide. The timing of the addition of these components to the solvent is not particularly limited as long as these components perform the primary functions as the terminal regulating agents; for example, a possible timing is the time when the aforementioned raw materials of the polyamide are added to the solvent.

Examples of the monoamine compounds are not limited to but include: aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and optional mixtures of these monoamines. From the viewpoint of the reactivity, boiling point, blocked terminal stability, price and the like, preferable among these are butylamine, hexylamine, octylamine, decylamine, stearylamine, cyclohexylamine and aniline. These may also be used each alone or in combinations of two or more thereof.

The aforementioned examples of the diamine compounds can be used as they are as the raw materials of the polyamide. These diamine compounds may be used each alone or in combinations of two or more thereof.

Examples of the aforementioned monocarboxylic acid compounds are not limited to but include: aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid and phenylacetic acid. In the present embodiment, these carboxylic acid compounds may be used each alone or in combinations of two or more thereof.

Examples of the aforementioned dicarboxylic acid compounds are not limited to but include the units derived from the following dicarboxylic acids: aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, diphenylmethane-4,4'-dicarboxylic acid, diphenylsulfone-4, 4'-dicarboxylic acid and 4,4'-biphenyldicarboxylic acid. These dicarboxylic acid compounds may be used each alone or in combinations of two or more thereof.

In the masterbatch pellet according to the present embodiment, a content of the thermoplastic resin (A) is preferably 50 to 99.5% by mass, more preferably 60 to 99% by mass and furthermore preferably 70 to 98% by mass.

The content of the thermoplastic resin (A) falling within the aforementioned range results in a tendency such that the finally obtained polyamide resin composition is excellent in mechanical strength and is reduced in the variation of the heat aging resistance.

[Metal Oxide (B)]

In the present embodiment, the metal oxide (B) means an oxide of a metal element. The metal element is not particularly limited; however, from the viewpoint of the heat aging resistance of the finally obtained polyamide resin composition, the metal element is preferably a transition metal element. Examples of the preferable metal oxide (B) include iron oxide, zinc oxide, cobalt oxide, nickel oxide, manganese oxide, chromium oxide and tin oxide; among these, iron oxide, zinc oxide, cobalt oxide and manganese oxide are more preferable, and iron oxide and zinc oxide are furthermore preferable and iron oxide is particularly preferable.

Examples of iron oxide include iron(II) oxide (ferrous oxide; hereinafter, also described as "FeO"), iron(III) oxide (ferric oxide; hereinafter, also described as "$Fe_2O_3$") and iron(II,III) oxide (triiron tetraoxide; hereinafter, also described as "$Fe_3O_4$"). Alternatively, the iron oxide may also be a composite oxide prepared by combining other metal oxides. Examples of such other metal oxides are not limited to but include the oxides of Ti, Mg, Mn, Zn, Co, Cr, Sb, Ni, Al and Cu. Among the compounds including the aforementioned iron oxides, $Fe_2O_3$, $Fe_3O_4$, a composite oxide between iron oxide and titanium(Ti) oxide, a composite oxide between iron oxide and magnesium(Mg) oxide, a composite oxide between iron oxide and manganese(Mn) oxide, a composite oxide between iron oxide and zinc(Zn) oxide, a composite oxide between iron oxide and cobalt(Co) oxide and a composite oxide between iron oxide and aluminum (Al) oxide are preferable, $Fe_2O_3$ and $Fe_3O_4$ are more preferable, and $Fe_3O_4$ is furthermore preferable. The use of $Fe_3O_4$ as the metal oxide (B) makes it possible to obtain a polyamide resin composition excellent in mechanical strength and heat aging resistance, and in particular, small in the variation of the mechanical strength after a long period thermal aging and excellent in thermal stability. The aforementioned compounds may be used each alone or in combinations of two or more thereof.

Hereinafter, the properties, before melt-kneading, of the metal oxide (B) used in the present embodiment are described.

A specific surface area of the metal oxide (B) such as iron oxide is not particularly limited; however, from the viewpoint of the improvement of the mechanical strength, impact resistance and heat aging resistance of the finally obtained polyamide resin composition, the specific surface area of the metal oxide (B) based on the BET method is preferably 10 $m^2/g$ or more. The specific surface area of the metal oxide (B) is more preferably 10 $m^2/g$ or more, furthermore preferably 20 to 100 $m^2/g$ and particularly preferably 25 to 70 $m^2/g$.

An average particle size of the metal oxide (B) such as iron oxide is not limited to a range of 20 µm or less, but preferably falls within the range of 20 µm or less from the viewpoint of the improvement of the impact resistance of the finally obtained polyamide resin composition. The average particle size of the metal oxide (B) is more preferably 15 µm or less and furthermore preferably 10 µm or less. The lower limit of the aforementioned average particle size is not particularly limited, but is preferably 0.01 µm or less. The average particle size in the present description is the volume-based particle size measured with a laser diffraction/scattering particle size distribution analyzer. In this measurement, water (containing isopropanol in a content of 3% by mass) is used as the dispersion solvent.

An average primary particle size of the metal oxide (B) such as iron oxide is not limited to a range of 0.2 µm or less, but is preferably 0.2 µm or less from the viewpoint of the improvement of the mechanical strength, impact resistance and heat aging resistance of the finally obtained polyamide resin composition. The average primary particle size of the metal oxide (B) is more preferably 0.15 µm or less and furthermore preferably 0.1 µm or less. The lower limit of the aforementioned average primary particle size is not particularly limited, but is preferably 0.001 µm or more. The average primary particle size in the present description is an average value derived from the measurement (image analysis) of the diameters of 100 particles arbitrarily selected from the particles photographed with a scanning electron microscope (SEM).

In the masterbatch pellet according to the present embodiment, a content of the metal oxide (B) is 0.5% by mass or more based on 100% by mass of the masterbatch pellet. The content of the metal oxide (B) set at 0.5% by mass or more makes it possible to reduce the variation of the heat aging resistance of the finally obtained polyamide resin composition, to also reduce the addition amount of the masterbatch pellet added to the polyamide resin composition, and to increase the production efficiency. The preferable content of the oxide (B) is 0.5 to 50% by mass. The content of the metal oxide (B) set at 50% by mass or less results in a tendency such that the dispersibility of the metal oxide (B) can be improved. The content of the metal oxide (B) is more preferably 1 to 30% by mass and furthermore preferably 2 to 20% by mass.

A content of the metal oxide (B) in the finally obtained polyamide resin composition based on 100 parts by mass of the polyamide resin is preferably 0.01 to 5 parts by mass, more preferably 0.03 to 1 part by mass and furthermore preferably 0.05 to 0.5 part by mass, from the viewpoint of the heat aging resistance of the polyamide resin composition.

In the masterbatch pellet of the present embodiment, a fraction of the metal oxide (B) after the melt-kneading is present as aggregated particles of 5 µm or more in a major axis length. By performing melt-kneading under the below-described conditions with the metal oxide (B) having the foregoing properties, a fraction of the metal oxide (B) can be made to be the aggregated particles of 5 µm or more in the major axis length. The upper limit of the major axis length of the aggregated particles of the metal oxide (B) is not particularly limited, but is preferably 100 µm or less.

Examples of the observation method of the aggregated particles include a method in which the cross section of the masterbatch pellet is photographed as reflected image by using an optical microscope, and a method in which a thin section is cut from the masterbatch pellet, and the thin section is photographed as transmission image.

In the present embodiment, the major axis length of the aggregated particle means a length of the longest straight-line section between the arbitrary two points on the outer circumference of the aggregated particle observed in the optical micrograph, irrespective of the shape of the observed aggregated particle.

In the present embodiment, the number of the aggregated particles of the metal oxide (B) after the melt-kneading of 5 µm or more in the major axis length per 1 $mm^2$ of the cross section of the masterbatch pellet is preferably 1 to 30/$mm^2$ and more preferably 1 to 20/$mm^2$. The number of the aggregated particles of 5 µm or more in the major axis length of 1/$mm^2$ or more results in a tendency such that the heat aging resistance of the polyamide resin composition is more improved, and the number of the aggregated particles of 5 µm or more in the major axis length of 30/$mm^2$ or less results in a tendency such that the variation of the heat aging resistance of the polyamide resin composition can be reduced.

In the present embodiment, the number of the aggregated particles of the metal oxide (B) after the melt-kneading of 5 µm or more in the major axis length can be measured as follows.

First, the optical micrograph of the cross section of the masterbatch pellet is taken at a magnification of 200×, three times in different observation areas of 1 $mm^2$ or more. Next, in each of the photographs obtained by the three times of photographing, an observation area of 1 $mm^2$ is arbitrarily determined, and the number of the aggregated particles of the metal oxide (B) of 5 µm or more in the major axis length present in the total area of 3 $mm^2$ is counted. From the number of the aforementioned aggregated particles, the average value per 1 $mm^2$ of the cross section of the pellet is derived, and the average value thus obtained is taken as the number of the aggregated particles of the metal oxide (B) of 5 µm or more in the major axis length.

In the masterbatch pellet of the present embodiment, proportion of the aggregated particles in the whole metal oxide (B) after the melt-kneading of 5 µm or more in the major axis length is preferably 30% by mass or less, more preferably 20% by mass or less and furthermore preferably 10% by mass or less. The lower limit of the proportion of the aggregated particles of 5 μm or more in the major axis length is not particularly limited, but is preferably 1% by mass or more. The proportion of the aggregated particles of 5 μm or more in the major axis length being 30% by mass or less results in a tendency such that the variation of the heat aging resistance of the polyamide resin composition can be reduced.

In the present embodiment, the proportion of the aggregated particles of 5 μm or more in the major axis length in the whole metal oxide (B) after the melt-kneading can be derived as follows.

First, as described above, by using the optical micrograph, the major axis length of each of the aggregated particles of 5 μm or more in the major axis length is determined. On the assumption that the aforementioned aggregated particles are spherical and the major axis length is the diameter, the volume fraction of the aggregated particles of the metal oxide (B) of 5 μm or more in the major axis length in the masterbatch pellet is derived. Here, the number of the aggregated particles is derived from the arbitrary observation area of 1 mm$^2$, and hence the volume of the masterbatch pellet to be adopted as the reference is 1 mm$^3$. Successively, the aforementioned volume fraction is converted into the weight fraction on the basis of the specific gravity of the metal oxide (B). From the ratio between the weight fraction of the aggregated particles of 5 μm or more in the major axis length and the weight fraction of the whole metal oxide (B) in the masterbatch pellet, the proportion of the aggregated particles of 5 μm or more in the major axis length in the whole metal oxide (B) is derived.

When a plurality of metal oxides (B) are used, the aforementioned proportion is derived as follows: an average specific gravity is derived from the weight proportions of the respective metal oxides (B) and the average specific gravity is used as the specific gravities of the respective metal oxides (B).

The aggregated particles of the metal oxide (B) are preferably present also in the polyamide resin composition. The presence of a fraction of the metal oxide (B) as the aggregated particles of 5 μm or more in the major axis length also in the polyamide resin composition results in a tendency such that the mechanical strength is improved and the variation of the heat aging resistance can be reduced.

[Dispersant (C)]

The raw material component used in the present embodiment may further contain a dispersant (C). The dispersant (C) is preferably preliminarily mixed with the foregoing metal oxide (B) before the melt-kneading of the raw material component. The preliminary mixing of the dispersant (C) with the metal oxide (B) can improve the dispersibility of the metal oxide (B) in the masterbatch pellet.

The apparatus for mixing the dispersant (C) and the metal oxide (B) is not particularly limited; examples of such an apparatus include: a tumbler, a Henschel mixer, an atomizer mill, a ploughshare mixer, a nauta mixer and jet mill; preferable among these is the Henschel mixer and the atomizer mill.

The mixing method of the dispersant (C) and the metal oxide (B) is not particularly limited: however, it is preferable to mix the dispersant (C) and the metal oxide (B) by using an atomizer mill while the dispersant (C) and the metal oxide (B) are being cooled so as for the dispersant (C) not to be melted. When the dispersant (C) is melted, the mixture in the mixing apparatus becomes nonuniform, and sometimes mixing failure occurs.

The mixing proportions of the dispersant (C) and the metal oxide (B) are not particularly limited; however, based on 100 parts by mass of the total amount of the dispersant (C) and the metal oxide (B), the amounts of the metal oxide (B) and the dispersant (C) are preferably 50 to 95 parts by mass and 5 to 50 parts by mass, respectively, more preferably 60 to 90 parts by mass and 10 to 40 parts by mass, respectively, and furthermore preferably 70 to 85 parts by mass and 15 to 30 parts by mass, respectively. The mixing proportions of the dispersant (C) and the metal oxide (B) falling within the aforementioned range enables the metal oxide (B) to be satisfactorily dispersed in the masterbatch pellet.

In the present embodiment, the dispersant (C) is not particularly limited as long as the dispersant (C) is a compound capable of improving the dispersibility of the metal oxide (B); however, examples of the dispersant (C) include higher fatty acid amides, higher fatty acid metal salts and higher fatty acid esters.

Examples of the higher fatty acid amides include amide compounds of higher fatty acids such as stearic acid, behenic acid, montanic acid, erucic acid and oleic acid. Examples of these higher fatty acid amides include stearic acid amide, behenic acid amide, oleic acid amide, erucic acid amide, palmitic acid amide, methylenebis-seartic acid amide, ethylenebis-stearic acid amide, ethylenebis-oleic acid amide, ethylenebis-erucic acid amide, N-stearylerucic acid amide, N-oleylpalmitic acid amide and p-phenylenebis-stearic acid amide.

Examples of the higher fatty acid metal salts include metal salts of higher fatty acids such as stearic acid, behenic acid, montanic acid, erucic acid and oleic acid. Examples of these higher fatty acid metal salts include lithium stearate, calcium stearate, magnesium stearate, aluminum monostearate, aluminum distearate, aluminum tristearate, zinc stearate, zinc behenate, calcium montanate, sodium montanate, lithium montanate, aluminum montanate, magnesium montanate and zinc montanate.

Examples of the higher fatty acid esters include esters of higher fatty acids such as stearic acid, behenic acid, montanic acid, erucic acid and oleic acid.

Examples of these higher fatty acid esters include stearyl stearate, octyl stearate, butyl stearate, behenyl behenate, montanic acid-1,3-butanediol ester and montanic acid polyol ester.

Preferable among these are ethylenebis-stearic acid amide, ethylenebis-oleic acid amide, ethylenebis-erucic acid amide, N-stearylerucic acid amide, calcium stearate, magnesium stearate, aluminum monostearate, aluminum distearate, aluminum tristearate, zinc stearate, calcium montanate, sodium montanate, lithium montanate, aluminum montanate, magnesium montanate and zinc montanate; and more preferable among these are ethylenebis-stearic acid amide, ethylenebis-erucic acid amide, N-stearylerucic acid amide, calcium stearate and calcium montanate.

These dispersants (C) may be used each alone or in combinations of two or more thereof.

A melting points of these dispersants (C) are preferably 120° C. or higher. The melting point of the dispersant (C) being 120° C. or higher results in a tendency such that the uniformity of the mixture of the dispersant (C) and the metal oxide (B) is improved and the dispersibility of the metal oxide (B) in the masterbatch pellet can be more improved.

The dispersant (C) is preferably a higher fatty acid amide having a melting point of 120° C. or higher. Such a dispersant (C) results in a tendency such that the uniformity of the mixture of the dispersant (C) and the metal oxide (B) is more improved and the dispersibility of the metal oxide (B) in the masterbatch pellet can be more improved.

[Other Additives]

To the masterbatch pellet according to the present embodiment, in addition to the aforementioned components, other components may be further added, if necessary, within a range not impairing the advantageous effects of the present embodiment.

The other components are not limited to the following, but the following may be added: an antioxidant, an ultraviolet absorber, a heat stabilizer, an antiphotodegradation agent, a plasticizer, a lubricant, a release agent, a nucleating agent, a flame retardant, a colorant, a dye and a pigment; other thermoplastic resins may also be mixed. The aforementioned other components are significantly different in nature from each other, and hence the preferable contents not impairing the advantageous effect of the present embodiment of the individual components are diverse. And, those skilled in the art can easily set the preferable content for each of the aforementioned other components.

[Production Method of Masterbatch]

The production method of the masterbatch pellet according to the present embodiment comprises a step of melt-kneading the raw material component containing the foregoing thermoplastic resin (A) and the foregoing metal oxide (B) by using an extruder.

In the production method of the masterbatch pellet according to the present embodiment, the raw material component preferably further contains the dispersant (C), and the production method preferably comprises a step of preliminarily mixing the dispersant (C) and the metal oxide (B) before the step of melt-kneading the raw material component.

The production method of the masterbatch pellet according to the present embodiment is not limited to the following method, but it is preferable to use a method in which melt-kneading is performed with a single or multiple screw extruder under a condition that the foregoing thermoplastic resin (A) is melted. In particular, it is preferable to use a double screw extruder as the extruder, from the viewpoint of the control of the aggregated particles of the metal oxide (B). Examples of the production method using a double screw extruder include: (i) a method in which the thermoplastic resin (A) and the metal oxide (B) are fed from an upstream feed opening and the melt-kneading is performed; and (ii) a method in which a double screw extruder equipped with an upstream feed opening and a downstream feed opening is used, the thermoplastic resin (A) is fed from the upstream feed opening and the metal oxide (B) is fed from the downstream feed opening, and thus the melt-kneading is performed.

Addition amounts of the thermoplastic resin (A) and the metal oxide (B) respectively correspond to the contents of the thermoplastic resin (A) and the metal oxide (B) in the foregoing masterbatch pellet.

The melt-kneading temperature in the production of the masterbatch pellet is not particularly limited; however, when the thermoplastic resin (A) having a melting point is used, the melt-kneading temperature is preferably equal to or higher than the melting point of the thermoplastic resin (A) and equal to or lower than the melting point of the thermoplastic resin (A)+50° C.; when the thermoplastic resin (A) having no melting point is used, the melt-kneading temperature is preferably equal to or higher than the glass transition temperature of the thermoplastic resin (A)+50° C. and equal to or lower than the glass transition temperature of the thermoplastic resin (A)+150° C. The melting point and the glass transition temperature of the thermoplastic resin (A) can be measured by using an apparatus such as a DSC on the basis of heretofore known methods.

For the purpose of controlling the aggregated particles of the metal oxide (B) in the masterbatch pellet, it is preferable to appropriately regulate the dispersion treatment, the processing conditions and others of the metal oxide (B) while the melt viscosity of the thermoplastic resin (A) and the dispersibility of the selected metal oxide (B) are being taken into account.

For example, when the dispersibility of the metal oxide (B) is good in the masterbatch pellet and it is difficult for a fraction of the metal oxide (B) to be present in the masterbatch pellet as the aggregated particles of 5 μm or more in the major axis length, it is preferable to regulate the melt viscosity in conformity with the nature of the thermoplastic resin (A). In particular, when the thermoplastic resin (A) is polyamide, the increase of the processing temperature so as to decrease the melt viscosity or the selection of the polyamide resin so as to be lower in molecular weight results in a tendency such that a fraction of the metal oxide (B) tends to be present as the aggregated particles of 5 μm or more in the major axis length. Also, when melt-kneading is conducted with an extruder, the regulation of the screw arrangement to decrease the kneading degree results in a tendency such that a fraction of the metal oxide (B) can be present as the aggregated particles of 5 μm or more in the major axis length. On the other hand, when the dispersibility of the metal oxide (B) is poor and it is difficult to achieve a preferable mode that the number of the aggregated particles of the metal oxide (B) of 5 μm or more in the major axis length falls within a range from 1 to 30 per 1 mm$^2$ of the cross section of the masterbatch pellet, or when it is difficult to set to be 30% by mass or less the proportion of the aggregated particle of 5 μm or more in the major axis length in the whole metal oxide (B) in the masterbatch pellet, a preliminary dispersion treatment of the metal oxide (B) with the dispersant (C), or the regulation of the screw arrangement or the regulation of the number of rotations of the screw so as to strengthen the shear in performing the melt-kneading results in a tendency such that the aggregated particles of the metal oxide (B) tend to be controlled to take the preferable mode.

[Polyamide Resin Composition]

The polyamide resin composition according to the present embodiment contains the foregoing masterbatch pellet and a polyamide resin. The polyamide resin composition containing the foregoing masterbatch pellet and the polyamide resin is excellent in mechanical strength and heat aging resistance, and in particular, small in the variation of the mechanical strength after a long period thermal aging and excellent in thermal stability.

In the polyamide resin composition, a fraction of the metal oxide (B) is preferably present as the aggregated particles of 5 μm or more in the major axis length. Such a polyamide resin composition results in a tendency such that the mechanical strength is improved and further the variation of the heat aging resistance can be reduced.

The polyamide resin composition according to the present embodiment is obtained by melt-kneading the raw material component containing the polyamide resin and the metal oxide (B), and a fraction of the metal oxide (B) after the melt-kneading is present as the aggregated particles of 5 μm or more in the major axis length.

As the polyamide resin constituting the polyamide resin composition according to the present embodiment, the polyamides listed as the specific examples of the aforementioned thermoplastic resin (A) can be used.

In the polyamide resin composition according to the present embodiment, a content of the foregoing masterbatch pellet is preferably 0.1 to 20% by mass, more preferably 0.3 to 10% by mass and furthermore preferably 0.3 to 5% by mass.

Also, in the polyamide resin composition according to the present embodiment, a content of the polyamide resin is preferably 40 to 99.9% by mass and more preferably 50 to 99.5% by mass.

The polyamide resin composition according to the present embodiment preferably further contains a copper compound, and an alkali metal halide and/or an alkaline earth metal halide.

Examples of the copper compound are not limited to but include: copper halides (such as copper iodide, cuprous bromide, cupric bromide and cuprous chloride), copper acetate, copper propionate, copper benzoate, copper adipate, copper terephthalate, copper isophthalate, copper salicylate, copper nicotinate and copper stearate; and copper complex salts in which chelating agents such as ethylenediamine and ethylenediamine tetraacetic acid are coordinated to copper. These copper compounds may be used each alone or in combinations of two or more thereof.

Preferable among the above-listed copper compounds is one or more selected from the group consisting of copper iodide, cuprous bromide, cupric bromide, cuprous chloride and copper acetate; copper iodide and/or copper acetate is more preferable. When such a preferable copper compound is used, it is possible to obtain a polyamide resin composition excellent in heat aging resistance and capable of suppressing the metal corrosion of the screw or the cylinder section (hereinafter, simply referred to as "metal corrosion") at the time of extrusion.

When the copper compound is used, a content of the copper compound in the polyamide resin composition is preferably 0.01 to 0.2% by mass and more preferably 0.02 to 0.15% by mass. The content of the copper compound falling within the aforementioned range results in a tendency such that the heat aging resistance of the polyamide resin composition is more improved and the deposition of copper and the metal corrosion can be suppressed.

From the viewpoint of improving the heat aging resistance of the polyamide resin composition, based on the total amount of the polyamide resin composition, a concentration of the contained copper element is preferably 20 to 1000 ppm, more preferably 100 to 500 ppm and furthermore preferably 150 to 300 ppm.

Examples of the alkali metal halide and/or the alkaline earth metal halide are not limited to but include: potassium iodide, potassium bromide, potassium chloride, sodium iodide and sodium chloride; and mixtures of two or more of these. From the viewpoint of the improvement of the heat aging resistance of the polyamide resin composition and the suppression of the metal corrosion, preferable among these are potassium iodide and potassium bromide, and a mixture of these; and potassium iodide is more preferable.

When the alkali metal halide and/or the alkaline earth metal halide is used, a content of the alkali metal halide and/or the content of the alkaline earth metal halide in the polyamide resin composition is preferably 0.05 to 5% by mass and more preferably 0.2 to 2% by mass. The content of the alkali metal halide and/or the content of the alkaline earth metal halide falling within the aforementioned range results in a tendency such that the heat aging resistance of the polyamide resin composition is more improved and the deposition of copper and the metal corrosion can be suppressed.

A ratio between the content of the copper compound and the content of the alkali metal halide and/or the alkaline earth metal halide is such that the copper compound and the alkali metal halide and/or the alkaline earth metal halide are contained in the polyamide resin composition so as for the molar ratio (halogen/copper) between halogen and copper in the whole polyamide resin composition to be preferably 2 to 50, more preferably 10 to 40 and furthermore preferably 15 to 30. The molar ratio (halogen/copper) between halogen and copper falling in the aforementioned range results in a tendency such that the heat aging resistance of the polyamide resin composition can be more improved. The halogen as referred to herein means the sum of the halogen derived from the copper halide when a copper halide is used as a copper compound and the halogen derived from the alkali metal halide and/or the alkaline earth metal halide.

The molar ratio (halogen/copper) between halogen and copper of 2 or more can preferably suppress the deposition of copper and the metal corrosion. On the other hand, the molar ratio (halogen/copper) between halogen and copper of 50 or less can preferably prevent the corrosion of the screw and the like of a molding machine almost without impairing the mechanical properties such as the heat resistance and the toughness of the polyamide resin composition.

The polyamide resin composition according to the present embodiment may further contain an inorganic filler. Examples of such an inorganic filler are not limited to but include: glass fiber, carbon fiber, calcium silicate fiber, potassium titanate fiber, aluminum borate fiber, glass flake, talc, kaolin, mica, hydrotalcite, calcium carbonate, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, ketchen black, acetylene black, furnace black, carbon nanotube, graphite, brass, copper, silver, aluminum, nickel, iron, calcium fluoride, montmorillonite, swelling fluorine mica and apatite. From the viewpoint of increasing the strength and the rigidity, preferable among these are glass fiber, carbon fiber, glass flake, talc, kaolin, mica, calcium carbonate, calcium monohydrogen phosphate, wollastonite, silica, carbon nanotube, graphite, calcium fluoride, montmorillonite, swelling fluorine mica and apatite. More preferable among these are glass fiber, carbon fiber, wollastonite, talc, mica, kaolin and silicon nitride. The aforementioned inorganic fillers may be used each alone or in combinations of two or more thereof.

Of the aforementioned glass fiber and carbon fiber, from the viewpoint of being capable of imparting excellent mechanical properties to the polyamide resin composition, furthermore preferable is fiber in which the number average fiber diameter is 3 to 30 μm, the weight average fiber length is 100 to 750 μm in the resin composition, and the aspect ratio (a value obtained by dividing the weight average fiber length by the number average fiber diameter) between the weight average fiber length and the number average fiber diameter is 10 to 100.

Of the aforementioned wollastonite, from the viewpoint of being capable of imparting excellent mechanical properties to the polyamide resin composition, furthermore preferable is wollastonite in which the number average fiber diameter is 3 to 30 μm, the weight average fiber length is 10 to 500 μm in the resin composition, and the aspect ratio is 3 to 100.

Of the aforementioned talc, mica, kaolin and silicon nitride, from the viewpoint of being capable of imparting excellent mechanical properties to the polyamide resin composition, furthermore preferable are talc, mica, kaolin and silicon nitride in each of which the number average fiber diameter is 0.1 to 3 μm.

The number average fiber diameter and the weight average fiber length in the present description are determined as follows: the polyamide resin composition is placed in an electric furnace; the organic matter contained in the polyamide resin composition is incinerated; from the incineration residue, for example, 100 or more pieces of inorganic filler are selected; the selected pieces are observed with a SEM and the fiber diameters of these pieces of inorganic filler are measured and thus the number average fiber diameter is measured; and at the same time, by using a SEM photograph taken at a magnification of 1000×, fiber lengths are measured and thus the weight average fiber length is determined.

The inorganic fillers may be surface treated with a silane coupling agent or the like. Examples of the silane coupling agent are not particularly limited but include: aminosilanes such as γ-aminopropyltriethoxysilane, γ-aminopropyltrimethoxysilane and N-β-(aminoethyl)-γ-aminopropylmethyldimethoxysilane; mercaptosilanes such as γ-mercaptopropyltrimethoxysilane and γ-mercaptopropyltriethoxysilane; epoxysilanes; and vinylsilanes. Among these, the silane coupling agent is preferably one or more selected from the above-listed silane coupling agents, and aminosilanes are more preferable.

The aforementioned glass fiber and carbon fiber may further contain, as the sizing agent, for example, the following: a copolymer containing as constituent units a carboxylic acid anhydride-containing unsaturated vinyl monomer and an unsaturated vinyl monomer other than the aforementioned carboxylic acid anhydride-containing unsaturated vinyl monomer; an epoxy compound; a polycarbodiimide compound; polyurethane resin; homopolymer of acrylic acid; copolymers between acrylic acid and other copolymerizable monomers and salts of these with primary amines, secondary amines and tertiary amines; and a copolymer containing a carboxylic acid anhydride-containing unsaturated vinyl monomer and an unsaturated vinyl monomer other than the aforementioned carboxylic acid anhydride-containing unsaturated vinyl monomer. These may be used each alone or in combinations of two or more of these. From the viewpoint of the mechanical strength of the polyamide resin composition, preferable among these are the copolymer containing as constituent units a carboxylic acid anhydride-containing unsaturated vinyl monomer and an unsaturated vinyl monomer other than the aforementioned carboxylic acid anhydride-containing unsaturated vinyl monomer, the epoxy compound, the polycarbodiimide compound, polyurethane resin, and combinations of these; more preferable are the copolymer containing as constituent units a carboxylic acid anhydride-containing unsaturated vinyl monomer and an unsaturated vinyl monomer other than the aforementioned carboxylic acid anhydride-containing unsaturated vinyl monomer, the carbodiimide compound and polyurethane resin, and combinations of these.

Glass fiber and carbon fiber are obtained as follows: the sizing agents are imparted to glass fiber and carbon fiber in the heretofore known production processes of the glass fiber and carbon fiber by using heretofore known methods such as a roller-type applicator to produce fiber strand; the resulting fiber strand is dried and thus the sizing agents are allowed to continuously react with fiber to yield the target fiber. The fiber strand may be used as roving as it is; or alternatively, the fiber strand is subjected to a cutting step and may be used as chopped glass strand. Such a sizing agent is imparted (added) in an amount preferably corresponding to 0.2 to 3% by mass and more preferably in an amount of 0.3 to 2% by mass in terms of solid content percentage based on 100% by mass of glass fiber or carbon fiber. From the viewpoint of maintaining the sizing of glass fiber or carbon fiber, the addition amount of the sizing agent is preferably 0.2% by mass or more in terms of the solid content percentage based on 100% by mass of glass fiber or carbon fiber. On the other hand, from the viewpoint of the improvement of the thermal stability of the polyamide resin composition, the addition amount of the sizing agent is preferably 3% or less. The drying of the strand may also be performed after the cutting step, or alternatively the strand may be cut after drying.

When the inorganic filler is used, a content of the inorganic filler in the polyamide resin composition is preferably 1 to 70% by mass, more preferably 10 to 60% by mass and furthermore preferably 20 to 55% by mass.

To the polyamide resin composition according to the present embodiment, other components may be further added in addition to the aforementioned components, if necessary, within a range not impairing the advantageous effects of the present embodiment.

To the polyamide resin composition according to the present embodiment, for example, the following additives may be added, the additives being not limited to the following: an antioxidant, an ultraviolet absorber, a heat stabilizer, an antiphotodegradation agent, a plasticizer, a lubricant, a release agent, a nucleating agent, a flame retardant, a colorant, a dye and a pigment; also, other thermoplastic resins may be mixed with the polyamide resin composition. The aforementioned other components are significantly different in properties from each other, the preferable contents of the individual components, not impairing the advantageous effects of the present embodiment are diverse. Those skilled in the art can easily set the appropriate content of each of the aforementioned other components.

In the present embodiment, a production method of the polyamide resin composition is not limited to the following method, but the following method can be used: a method in which the foregoing masterbatch and the polyamide resin, and preferably further a copper compound, an alkali metal halide and/or an alkaline earth metal halide are kneaded with a single screw or multiple screw extruder under the condition that these are melted. When an inorganic filler is used, it is preferable to use a method in which a double screw extruder equipped with an upstream feed opening and a downstream feed opening is used, a polyamide resin, a copper compound, an alkali metal halide and/or an alkaline earth metal halide and the foregoing masterbatch pellet are fed from the upstream feed opening and melted, then an inorganic filler is fed from the downstream feed opening, and then the resulting mixture is melt-kneaded. Also when roving of glass fiber or carbon fiber is used, the roving can be compounded by heretofore known methods.

The polyamide resin composition obtained in this way can be used, without any particular restriction, for example, as molded articles of various components produced by injection molding.

These various components obtained from the polyamide resin composition can be suitably used, for example, for automobiles, mechanical industries, electric and electronic fields, industrial materials, and daily and household commodities.

EXAMPLES

Hereinafter, the present embodiment is more specifically described with reference to Examples, Reference Example and Comparative Examples, but the present embodiment is not limited to these Examples.

[Raw Materials]
1. Thermoplastic Resin (A)

As the thermoplastic resin (A), following polyamide 66 (hereinafter, abbreviated as "PA66") was used.

PA66; trade name: Leona (registered trademark) 1300 (manufactured by Asahi Kasei Chemicals Corp., melting point: 260° C.)

2. Metal Oxide (B)

As the metal oxide (B), the iron oxide (hereinafter, abbreviated as "$Fe_3O_4$") described in following 2-1, the iron oxide (hereinafter, abbreviated as "$Fe_2O_3$-1") described in following 2-2 and the iron oxide (hereinafter, abbreviated as "$Fe_2O_3$-2") described in following 2-3 were used.

2-1. Iron oxide; trade name JC-MR01 (manufactured by JFE Chemical Corp.). The average primary particle size based on the SEM method was 0.08 μm, the average particle size based on the laser diffraction/scattering particle size distribution measurement method was 7.5 μm, and the specific surface area based on the BET method was 34 $m^2/g$.

2-2. Iron oxide; trade name JC-FH04 (manufactured by JFE Chemical Corp.). The average primary particle size based on the SEM method was 0.08 μm, the average particle size based on the laser diffraction/scattering particle size distribution measurement method was 0.2 μm, and the specific surface area based on the BET method was 15 $m^2/g$.

2-3. Iron oxide; trade name CM-1000 (manufactured by Chemirite, Ltd.). The average primary particle size based on the SEM method was 0.05 μm, the average particle size based on the laser diffraction/scattering particle size distribution measurement method was 0.06 μm, and the specific surface area based on the BET method was 40 $m^2/g$.

3. Dispersant (C)

As the dispersant (C), ethylenebis-stearic acid amide (hereinafter, abbreviated as "EBS") described in following 3-1 and calcium montanate (hereinafter, abbreviated as "CaV") described in following 3-2 were used.

3-1. Ethylenebis-stearic acid amide; trade name: Alflow (registered trademark) H-50F (manufactured by NOF Corp., melting point: 140° C.)

3-2. Calcium montanate; trade name: Licomont (registered trademark) CaV102 (manufactured by Clariant (Japan) K.K., melting point: 145° C.)

4. Copper Iodide (hereinafter, abbreviated as "CuI")

A reagent manufactured by Wako Pure Chemical Industries, Ltd. was used.

5. Potassium Iodide (hereinafter, abbreviated as "KI")

A reagent manufactured by Wako Pure Chemical Industries, Ltd. was used.

6. Glass Fiber (hereinafter, abbreviated as "GF")

Trade name: ECS 03T-275H (manufactured by Nippon Electric Glass Co., Ltd.) was used.

[Evaluation Methods]

Hereinafter, the evaluation methods applied in Examples, Reference Example and Comparative Examples are described.

<Observation of Aggregated Particles of Metal Oxide (B)>

A sample for observation was cut out with a microtome from the masterbatch pellet obtained in each of Examples, Reference Example and Comparative Examples in such a way that a smooth pellet cross section was formed. The pellet cross section of the sample for observation was observed by using an optical microscope on the basis of the reflection method at a magnification of 200× and photographed. The photographing was performed three times for different observation areas of 1 $mm^2$ or more in terms of the pellet cross section.

(a) Measurement of Number of Aggregated Particles of Metal Oxide (B) of 5 μm or More in Major Axis Length In each of the photographs obtained by the three times of photographing, arbitrarily an observation area was determined to be 1 $mm^2$, and the number of the aggregated particles of the metal oxide (B) of 5 μm or more in the major axis length present in the total area of 3 $mm^2$ was counted. From the number of the aggregated particles, an average value per 1 $mm^2$ of the pellet cross section was derived, and was taken as the number of the aggregated particles of the metal oxide (B) of 5 μm or more in the major axis length.

The major axis length of the aggregated particle meant a length of the longest straight-line section between the arbitrary two points on the outer circumference of the observed aggregated particle, irrespective of the shape of the observed aggregated particle.

(b) Measurement of Proportion of Aggregated Particles of 5 μm or More in Major Axis Length The proportion of the aggregated particles in the whole metal oxide (B) of 5 μm or more in the major axis length was derived as follows.

First, as described above in (a), the major axis length of each of the aggregated particles of 5 μm or more in the major axis length was determined. On the assumption that the aforementioned aggregated particles are spherical and the major axis length is the diameter, the volume fraction of the aggregated particles of the metal oxide (B) of 5 μm or more in the major axis length in the masterbatch pellet was derived. Here, the number of the aggregated particles was derived from the arbitrary observation area of 1 $mm^2$, and hence the volume of the masterbatch pellet to be adopted as the reference was taken to be 1 $mm^3$. Successively, the aforementioned volume fraction was converted into the weight fraction on the basis of the specific gravity of the metal oxide (B). From the ratio between the weight fraction of the aggregated particles of 5 μm or more in the major axis length and the weight fraction of the whole metal oxide (B) in the masterbatch pellet, the proportion of the aggregated particles of 5 μm or more in the major axis length in the whole metal oxide (B) was derived.

<Tensile Strength>

Each of the pellets of the polyamide resin compositions obtained in Examples, Reference Example and Comparative Examples was molded into a molded piece of the multipurpose specimen of type A in conformity with ISO 3167 by using an injection molding machine (PS-40E, manufactured by Nissei Plastic Industrial Co., Ltd.). In this case, the injection and pressure maintenance time was set at 25 seconds, the cooling time was set at 15 seconds, the mold temperature was set at 80° C. and the molten resin temperature was set at 290° C. By using the obtained multipurpose specimens (type A), a tensile test was performed in conformity with ISO 527, at a tensile rate of 5 mm/min, and thus the tensile strengths of the specimens were measured.

<Tensile Strength After Thermal Aging>

The aforementioned multipurpose specimens (type A) were subjected to a thermal aging at 230° C. for 500 hours in a hot air circulation oven. The multipurpose specimens (type A) were cooled at 23° C. for 24 hours or more, and then subjected to a tensile test at a tensile rate of 5 mm/min in conformity with ISO 527. A set of the 10 specimens was subjected to the tensile test and the average value of the 10 tensile strengths was taken as the tensile strength. The maximum tensile strength and the minimum tensile strength of the set of the 10 specimens were determined, and the value of (maximum value−minimum value)/(average value)×100 was taken as the variation of the tensile strength.

Production Example 1

Fe$_3$O$_4$ and EBS were placed in a Henschel mixer (FM-20C/I, manufactured by Mitsui Mining Co., Ltd.) in such a way that the mass ratio (Fe$_3$O$_4$/EBS) was 80/20, and the resulting mixture was stirred for 10 minutes at 3,000 rpm while the apparatus was being cooled with water to obtain a mixture 1 of Fe$_3$O$_4$ and EBS.

Production Example 2

Fe$_3$O$_4$ and EBS were placed in an atomizer mill (TAP-1, manufactured by Tokyo Atomizer M.F.G. Co., Ltd.) in such a way that the mass ratio (Fe$_3$O$_4$/EBS) was 80/20, and the resulting mixture was stirred for 10 minutes at 10,000 rpm while the apparatus was being cooled with water to obtain a mixture 2 of Fe$_3$O$_4$ and EBS.

Production Example 3

A mixture 3 of Fe$_3$O$_4$ and EBS was obtained in the same manner as in Production Example 2 except that the mass ratio (Fe$_3$O$_4$/EBS) was set at 50/50.

Production Example 4

A mixture 4 of Fe$_2$O$_3$-1 and EBS was obtained in the same manner as in Production Example 2 except that the mass ratio (Fe$_2$O$_3$-1/EBS) was set at 80/20.

Production Example 5

A mixture 5 of Fe$_3$O$_4$ and CaV was obtained in the same manner as in Production Example 2 except that the mass ratio (Fe$_3$O$_4$/CaV) was set at 80/20.

Production Example 6

A mixture 6 of Fe$_2$O$_3$-2 and EBS was obtained in the same manner as in Production Example 2 except that the mass ratio (Fe$_2$O$_3$-2/EBS) was set at 80/20.

Example 1

A double screw extruder (ZSK-26MC, manufactured by Coperion GmbH (Germany)) was used which had an upstream feed opening in the first barrel from the upstream side of the extruder and had the ratio of L/D (the cylinder length of the extruder/the cylinder diameter of the extruder)=48 (the number of barrels: 12). In the double screw extruder, the section from the upstream feed opening to the die was set at 290° C., the number of rotations of the screw was set at 300 rpm, and the discharge rate was set at 20 kg/hr. Under such conditions, PA66 and Fe$_3$O$_4$ were respectively fed from the upstream feed opening so as for the proportions of these to be the proportions shown in the upper section of Table 1 presented below, and the resulting mixture was melt-kneaded to produce a masterbatch pellet (hereinafter, abbreviated as "MB1"). The number of the aggregated particles of the metal oxide (B) of 5 μm or more in the major axis length in MB1 obtained and the proportion of the aggregated particles of the metal oxide (B) of 5 μm or more in the major axis length in the whole metal oxide (B) in MB1 obtained were measured as described above. These measurement results were shown in Table 1 presented below.

Example 2

A mixture a was obtained by preliminarily dry blending Fe$_3$O$_4$ and EBS according to the proportions shown in the upper section of Table 1 presented below. Subsequently, in the same manner as in Example 1, a double screw extruder was used, and PA66 and the mixture a were fed from the upstream feed opening in such a way that the proportions shown in the upper section of Table 1 presented below were satisfied, and the resulting mixture was melt-kneaded to produce a masterbatch pellet (hereinafter, abbreviated as "MB2"). The number of the aggregated particles of the metal oxide (B) of 5 μm or more in the major axis length in MB2 obtained and the proportion of the aggregated particles of the metal oxide (B) of 5 μm or more in the major axis length in the whole metal oxide (B) in MB2 obtained were measured as described above. These measurement results were shown in Table 1 presented below.

Examples 3 to 8 and Reference Example 1

Masterbatch pellets (hereinafter, abbreviated as "MB3 to MB9" in the order of Examples 3 to 8 and Reference Example 1) were each produced in the same manner as in Example 1 except that any of the mixtures 1 to 5 obtained in Production Examples 1 to 5 was used, wherein a double screw extruder was used, PA66 and any of the mixtures 1 to 6 were fed from the upstream feed opening in such a way that the proportions shown in the upper section of Table 1 presented below were satisfied, and the resulting mixture was melt-kneaded to produce a masterbatch pellet. The number of the aggregated particles of the metal oxide (B) of 5 μm or more in the major axis length in each of the masterbatch pellets obtained and the proportion of the aggregated particles of the metal oxide (B) of 5 μm or more in the major axis length in the whole metal oxide (B) in each of the masterbatch pellets obtained were measured as described above. These measurement results were shown in Table 1 presented below.

Comparative Example 1

A masterbatch pellet (hereinafter, abbreviated as "MB10") was produced in the same manner as in Example 1 except that the mixture 6 obtained in Production Example 6 was used, wherein a double screw extruder was used, PA66 and the mixture 6 were fed from the upstream feed opening in such a way that the resulting mixture contained 95 parts by mass of PA66 and 5 parts by mass of the mixture 6, and the resulting mixture was melt-kneaded to produce a masterbatch pellet. In the obtained masterbatch pellet, no aggregated particles of the metal oxide (B) of 5 μm or more in the major axis length were identified.

Comparative Example 2

A double screw extruder (ZSK-26MC, manufactured by Coperion GmbH (Germany)) was used which had an upstream feed opening in the first barrel from the upstream side of the extruder and had the ratio of L/D (the cylinder length of the extruder/the cylinder diameter of the extruder)=48 (the number of barrels: 12). In the double screw extruder, the screw arrangement was altered so as to exert a stronger shear than in Example 1, the section from the upstream feed opening to the die was set at 290° C., the number of rotations of the screw was set at 300 rpm, and the discharge rate was set at 20 kg/hr. Under such conditions, PA66 and the mixture 2 were respectively fed from the upstream feed opening in such a way that the resulting mixture contained 95 parts by mass of PA66 and 5 parts by mass of the mixture 2, and the resulting mixture was melt-kneaded to produce a masterbatch pellet. Further, under the same conditions, the obtained pellet was again melt-kneaded to produce a masterbatch pellet (hereinafter, abbreviated as "MB11"). In the obtained masterbatch pellet, no aggregated particles of the metal oxide (B) of 5 μm or more in the major axis length were identified.

TABLE 1

| | | Example 1 | Example 2 | Example 3 | Example 4 | Example 5 | Example 6 | Example 7 |
|---|---|---|---|---|---|---|---|---|
| Raw materials | | | | | | | | |
| PA66 | parts by mass | 96 | 95 | 95 | 95 | 92 | 95 | 95 |
| Fe3O4 | parts by mass | 4 | 4 | — | — | — | — | — |
| EBS | parts by mass | — | 1 | — | — | — | — | — |
| $Fe_3O_4$/EBS = 80/20(Mixture 1) | parts by mass | — | — | 5 | — | — | — | — |
| $Fe_3O_4$/EBS = 80/20(Mixture 2) | parts by mass | — | — | — | 5 | — | — | — |
| $Fe_3O_4$/EBS = 50/50(Mixture 3) | parts by mass | — | — | — | — | 8 | — | — |
| $Fe_2O_3$-1/EBS = 80/20(Mixture 4) | parts by mass | — | — | — | — | — | 5 | — |
| Fe3O4/CaV = 80/20(Mixture 5) | parts by mass | — | — | — | — | — | — | 5 |
| $Fe_2O_3$-2/EBS = 80/20(Mixture 6) | parts by mass | — | — | — | — | — | — | — |
| Type of masterbatch pellet | | MB1 | MB2 | MB3 | MB4 | MB5 | MB6 | MB7 |
| Metal oxide content in masterbatch pellet | % by mass | 4 | 4 | 4 | 4 | 4 | 4 | 4 |
| Measurement results | | | | | | | | |
| Number of aggregated particles of 5 μm or more in major axis length | particles/mm$^2$ | 29 | 28 | 23 | 7 | 15 | 10 | 11 |
| Proportion of aggregated particles of 5 μm or more in major axis length | % by mass | 29.8 | 23.8 | 17.6 | 7.9 | 21.9 | 10.2 | 8.9 |

| | | Example 8 | Reference Example 1 | Comparative Example 1 | Comparative Example 2 |
|---|---|---|---|---|---|
| Raw materials | | | | | |
| PA66 | parts by mass | 80 | 99.5 | 95 | 95 |
| Fe3O4 | parts by mass | — | — | — | — |
| EBS | parts by mass | — | — | — | — |
| $Fe_3O_4$/EBS = 80/20(Mixture 1) | parts by mass | — | — | — | — |
| $Fe_3O_4$/EBS = 80/20(Mixture 2) | parts by mass | 20 | 0.5 | — | 5 |
| $Fe_3O_4$/EBS = 50/50(Mixture 3) | parts by mass | — | — | — | — |
| $Fe_2O_3$-1/EBS = 80/20(Mixture 4) | parts by mass | — | — | — | — |
| Fe3O4/CaV = 80/20(Mixture 5) | parts by mass | — | — | — | — |
| $Fe_2O_3$-2/EBS = 80/20(Mixture 6) | parts by mass | — | — | 5 | — |
| Type of masterbatch pellet | | MB8 | MB9 | MB10 | MB11 |
| Metal oxide content in masterbatch pellet | % by mass | 16 | 0.4 | 4 | 4 |
| Measurement results | | | | | |
| Number of aggregated particles of 5 μm or more in major axis length | particles/mm$^2$ | 29 | 2 | 0 | 0 |
| Proportion of aggregated particles of 5 μm or more in major axis length | % by mass | 7.8 | 41.1 | 0 | 0 |

Examples 9 to 16

A double screw extruder (ZSK-26MC, manufactured by Coperion GmbH (Germany)) was used which had an upstream feed opening in the first barrel from the upstream side of the extruder, had an downstream feed opening in the ninth barrel from the upstream side and had the ratio of L/D (the cylinder length of the extruder/the cylinder diameter of the extruder)=48 (the number of barrels: 12). In the double screw extruder, the section from the upstream feed opening to the die was set at 290° C., the number of rotations of the screw was set at 250 rpm, and the discharge rate was set at 25 kg/hr. Under such conditions, in such a way that the proportions shown in the upper sections of Tables 2 and 3 presented below were satisfied, PA66, any of the aforementioned MB1 to MB8, and CuI and KI were respectively fed from the upstream feed opening, and GF was fed from the downstream feed opening. By melt-kneading the resulting mixtures, pellets of polyamide resin compositions were produced. Each of the obtained pellets of the polyamide resin compositions was dried until the moisture content became 800 ppm or less. After the drying, by using each of the pellets of the polyamide resin compositions, the tensile strength and the tensile strength after thermal aging were evaluated as described above. The results of these evaluations (counted numbers) and the like were shown in Tables 2 and 3 presented below.

The pellet cross section of each of the obtained resin compositions was observed by using an optical microscope on the basis of the reflection method at a magnification of 200×; such an observation was performed for the 10 observation areas different from each other; thus, from any of the samples, the aggregated particles of the metal oxide (B) of 5 μm or more in the major axis length were observed.

Comparative Examples 3 and 4

In the same manner as in Example 9 except that aforementioned MB9 and $Fe_3O_4$ were used, a double screw extruder was used, PA66, aforementioned MB9, $Fe_3O_4$, CuI and KI were respectively fed from the upstream feed opening and GF was fed from the downstream feed opening in such a way that the proportions shown in the upper section of Table 2 presented below were satisfied. By melt-kneading the resulting mixtures, pellets of polyamide resin compositions were produced. Each of the obtained pellets of the polyamide resin compositions was dried until the moisture content became 800 ppm or less. After the drying, by using each of the pellets of the polyamide resin compositions, the tensile strength and the tensile strength after thermal aging were evaluated as described above. The results of these evaluations (counted numbers) and the like were shown in Table 2 presented below.

The pellet cross section of each of the obtained resin compositions was observed by using an optical microscope on the basis of the reflection method at a magnification of 200×; such an observation was performed for the 10 observation areas different from each other; thus, from any of the samples, the aggregated particles of the metal oxide (B) of less than 5 μm in the major axis length were observed, but no aggregated particles of the metal oxide (B) of 5 μm or more in the major axis length were observed.

Comparative Examples 5 and 6

In the same manner as in Example 9 except that aforementioned MB10 and MB11 were used, a double screw extruder was used, PA66, either of aforementioned MB10 and MB11, CuI and KI were respectively fed from the upstream feed opening and GF was fed from the downstream feed opening in such a way that the proportions shown in the upper sections of Tables 2 and 3 presented below were satisfied. By melt-kneading the resulting mixtures, pellets of polyamide resin compositions were produced. Each of the obtained pellets of the polyamide resin compositions was dried until the moisture content became 800 ppm or less. After the drying, by using each of the pellets of the polyamide resin compositions, the tensile strength and the tensile strength after thermal aging were evaluated as described above. The results of these evaluations (counted numbers) and the like were shown in Tables 2 and 3 presented below. From each of the samples of the obtained pellets of the resin compositions, no aggregated particles of the metal oxide (B) of 5 μm or more in the major axis length were observed.

TABLE 2

| | | | Example 9 | Example 10 | Example 11 | Example 12 | Example 13 | Example 15 |
|---|---|---|---|---|---|---|---|---|
| Resin composition components | | | | | | | | |
| PA66 | | parts by mass | 65 | 65 | 65 | 65 | 65 | 65 |
| MB1 | | parts by mass | 2 | — | — | — | — | — |
| MB2 | | parts by mass | — | 2 | — | — | — | — |
| MB3 | | parts by mass | — | — | 2 | — | — | — |
| MB4 | | parts by mass | — | — | — | 2 | — | — |
| MB5 | | parts by mass | — | — | — | — | 2 | — |
| MB7 | | parts by mass | — | — | — | — | — | 2 |
| MB8 | | parts by mass | — | — | — | — | — | — |
| MB9 | | parts by mass | — | — | — | — | — | — |
| MB11 | | parts by mass | — | — | — | — | — | — |
| $Fe_3O_4$ | | parts by mass | — | — | — | — | — | — |
| CuI | | parts by mass | 0.03 | 0.03 | 0.03 | 0.03 | 0.03 | 0.03 |
| KI | | parts by mass | 0.5 | 0.5 | 0.5 | 0.5 | 0.5 | 0.5 |
| GF | | parts by mass | 33 | 33 | 33 | 33 | 33 | 33 |
| Evaluation results of resin composition | | | | | | | | |
| Tensile strength | | MPa | 199 | 199 | 200 | 202 | 197 | 202 |
| After 500- | Tensile strength | MPa | 162 | 164 | 166 | 171 | 165 | 170 |
| hour | Maximum | MPa | 164 | 166 | 169 | 173 | 168 | 172 |
| thermal | Minimum | MPa | 151 | 153 | 159 | 170 | 156 | 168 |
| aging | Variation | % | 8.0 | 7.9 | 6.0 | 1.8 | 7.3 | 2.4 |

TABLE 2-continued

|  |  |  | Example 16 | Comparative Example 3 | Comparative Example 4 | Comparative Example 6 |
|---|---|---|---|---|---|---|
| Resin composition components |  |  |  |  |  |  |
| PA66 | parts by mass |  | 66.5 | 47 | 66.9 | 65 |
| MB1 | parts by mass |  | — | — | — | — |
| MB2 | parts by mass |  | — | — | — | — |
| MB3 | parts by mass |  | — | — | — | — |
| MB4 | parts by mass |  | — | — | — | — |
| MB5 | parts by mass |  | — | — | — | — |
| MB7 | parts by mass |  | — | — | — | — |
| MB8 | parts by mass |  | 0.5 | — | — | — |
| MB9 | parts by mass |  | — | 20 | — | — |
| MB11 | parts by mass |  | — | — | — | 2 |
| $Fe_3O_4$ | parts by mass |  | — | — | 0.1 | — |
| CuI | parts by mass |  | 0.03 | 0.03 | 0.03 | 0.03 |
| KI | parts by mass |  | 0.5 | 0.5 | 0.5 | 0.5 |
| GF | parts by mass |  | 33 | 33 | 33 | 33 |
| Evaluation results of resin composition |  |  |  |  |  |  |
| Tensile strength |  | MPa | 201 | 199 | 199 | 189 |
| After 500- | Tensile strength | MPa | 167 | 157 | 158 | 155 |
| hour | Maximum | MPa | 169 | 163 | 162 | 158 |
| thermal | Minimum | MPa | 160 | 138 | 139 | 149 |
| aging | Variation | % | 5.4 | 15.9 | 14.6 | 5.8 |

TABLE 3

|  |  |  | Example 14 | Comparative Example 5 |
|---|---|---|---|---|
| Resin composition components |  |  |  |  |
| PA66 | parts by mass |  | 65 | 65 |
| MB6 | parts by mass |  | 2 | — |
| MB10 | parts by mass |  | — | 2 |
| CuI | parts by mass |  | 0.03 | 0.03 |
| KI | parts by mass |  | 0.5 | 0.5 |
| GF | parts by mass |  | 33 | 33 |
| Evaluation results of resin composition |  |  |  |  |
| Tensile strength |  | MPa | 175 | 170 |
| After 500-hour | Tensile strength | MPa | 125 | 114 |
| thermal aging | Maximum | MPa | 127 | 118 |
|  | Minimum | MPa | 122 | 109 |
|  | Variation | % | 4.0 | 7.9 |

As can be seen from Table 2, the polyamide resin compositions obtained in Examples 9 to 16 each of which used the masterbatch pellet containing the metal oxide (B) in a content of 0.5% by mass or more wherein a fraction of the metal oxide (B) was present as the aggregated particles of 5 μm or more in the major axis length were excellent in mechanical strength and heat aging resistance, and moreover, were reduced in the variation of the heat aging resistance, as compared to the polyamide resin compositions obtained in Comparative Examples 3 and 4 in each of which no aforementioned masterbatch pellet was used.

From the aforementioned results, it has been found that the masterbatch pellet containing the metal oxide (B) therein in a content of 0.5% by mass or more, wherein a fraction of the metal oxide (B) is present as the aggregated particles of 5 μm or more in the major axis length, effectively contributes to the improvement of the mechanical strength and the heat aging resistance of the polyamide resin composition.

From what has been described above, it has been found that by using the masterbatch pellet of the present embodiment, the mechanical strength and the heat aging resistance can be remarkably improved, and a polyamide resin composition excellent in thermal stability, and suitable for automobile components, various electronic components and the like is obtained.

The present application is based on Japanese Patent Application (Japanese Patent Application No. 2010-117506) filed on May 21, 2010, the contents of which are incorporated herein by reference.

INDUSTRIAL APPLICABILITY

The polyamide resin composition obtained by using the masterbatch pellet of the present invention is excellent in mechanical strength and heat aging resistance, and hence can be suitably applied to molded articles required to have high levels of mechanical physical properties such as automobile components.

The invention claimed is:

1. A masterbatch pellet obtained by melt-kneading a raw material component comprising a thermoplastic resin (A) and a metal oxide (B),
   wherein the metal oxide (B) is one or more selected from the group consisting of iron oxide, zinc oxide, cobalt oxide, nickel oxide, manganese oxide, chromium oxide, and tin oxide,
   a content of the metal oxide (B) is 0.5% by mass or more; and
   a fraction of the metal oxide (B) after the melt-kneading is present as an aggregated particle of 5μm or more in a major axis length, and
   the number of aggregated particles of metal oxide (B) that are 5-μm or more in major axis length, in a cross section of the masterbatch pellet, after melt-kneading, is 1 to 30/mm².

2. The masterbatch pellet according to claim 1, wherein a proportion of the aggregated particles of 5 μm or more in a major axis length in a whole metal oxide (B) after the melt-kneading is 30% by mass or less.

3. The masterbatch pellet according to claim 1, wherein the raw material component further comprises a dispersant (C); and the dispersant (C) and the metal oxide (B) are preliminarily mixed before the melt-kneading.

4. The masterbatch pellet according to claim 1, wherein the thermoplastic resin (A) is polyamide.

5. The masterbatch pellet according to claim 1, wherein the metal oxide (B) is iron oxide.

6. The masterbatch pellet according to claim 3, wherein the dispersant (C) is a higher fatty acid amide having a melting point of 120° C. or higher.

7. A method for producing the masterbatch pellet according to claim 1, comprising melt-kneading a raw material component comprising a thermoplastic resin (A) and a metal oxide (B) by using an extruder.

8. The method for producing the masterbatch pellet according to claim 7,
wherein the raw material component further comprises a dispersant (C); and the method further comprises, before the melt-kneading, preliminary mixing the dispersant (C) and the metal oxide (B).

9. A polyamide resin composition comprising:
the masterbatch pellet according to claim 1; and
a polyamide resin.

10. The polyamide resin composition according to claim 9, wherein a fraction of the metal oxide (B) is present in the polyamide resin composition as an aggregated particle of 5μm or more in a major axis length.

11. The polyamide resin composition according to claim 9, further comprising:
a copper compound; and
an alkali metal halide and/or an alkaline earth metal halide.

12. The masterbatch pellet according claim 2, wherein the thermoplastic resin (A) is polyamide.

13. The masterbatch pellet according to claim 2, wherein the metal oxide (B) is iron oxide.

* * * * *